(12) United States Patent
Chang

(10) Patent No.: US 6,826,640 B1
(45) Date of Patent: Nov. 30, 2004

(54) BUS BANDWIDTH CONTROL SYSTEM

(75) Inventor: Christopher Chang, Medfield, MA (US)

(73) Assignee: Digi International Inc., Minnetonka, MN (US)

( * ) Notice: Subject to any disclaimer, the term of this patent is extended or adjusted under 35 U.S.C. 154(b) by 28 days.

(21) Appl. No.: 10/454,096

(22) Filed: Jun. 4, 2003

(51) Int. Cl.[7] .................. G06F 13/14; G06F 13/36
(52) U.S. Cl. .................. 710/107; 710/240; 370/438
(58) Field of Search ................. 710/113, 240, 710/107, 112, 41, 110; 370/431, 438; 709/209, 211; 361/683; 712/31–32

(56) References Cited

U.S. PATENT DOCUMENTS

| | | | |
|---|---|---|---|
| 4,703,420 A | * 10/1987 | Irwin ........................ | 710/113 |
| 5,131,081 A | * 7/1992 | MacKenna et al. .......... | 710/22 |
| 5,241,632 A | 8/1993 | O'Connell et al. | |
| 5,506,969 A | 4/1996 | Wall et al. | |
| 5,506,972 A | * 4/1996 | Heath et al. ............... | 710/113 |
| 5,771,358 A | 6/1998 | LaBerge | |
| 6,115,374 A | 9/2000 | Stonebridge et al. | |

OTHER PUBLICATIONS

"Performance model for a prioritized multiple–bus multiprocessor system" by John, L.K; Yu–Cheng Liu (abstract only) Publication Date: May 1996.*

"Performance model for a prioritized multiple–bus multiprocessor system" by Kurian, L; Yu–Cheng Liu (abstract only) Publication Date: Oct. 26–29, 1994.*

Eureka Technology, EC300 PCI Bus Arbiter product summary (2 pages) ©2000 by Eureka Technology Inc., http://www.eurekatech.com.

* cited by examiner

*Primary Examiner*—Gopal C. Ray
(74) *Attorney, Agent, or Firm*—Fish & Richardson P.C.

(57) ABSTRACT

A system includes a central processing unit (CPU), one or more input/output (I/O) ports designed to connect with external devices, a data bus connecting the CPU with the I/O ports, bus request and grant channels, and a bus arbiter that executes a repetitive series of the positive number of cycles, where for each cycle, for each of the bus request and grant channels that is assigned to a bus master and that has a weight equal or greater than a number of cycles already executed, if the bus master assigned to the bus request and grant channel has data waiting to be transferred on the bus then the bus arbiter grants bus access to the bus master to transfer a data packet from the data using the data bus.

16 Claims, 5 Drawing Sheets

50 Bus Request Config

| Bus Channel | Assignment |
|---|---|
| 1 | CPU - 14 |
| 2 | I/O B - 20 |
| 3 | I/O C - 24 |
| 4 | I/O D - 28 |
| 5 | Unassigned |
| 6 | Unassigned |
| 7 | Unassigned |
| 8 | Unassigned |
| 9 | Unassigned |
| 10 | Unassigned |

FIG. 2A

52 Bus Request Config

| Bus Channel | Assignment |
|---|---|
| 1 | CPU - 14 |
| 2 | I/O B - 20 |
| 3 | I/O C - 24 |
| 4 | I/O D - 29 |
| 5 | I/O B - 20 |
| 6 | Unassigned |
| 7 | Unassigned |
| 8 | Unassigned |
| 9 | Unassigned |
| 10 | Unassigned |

FIG. 2B

54 Bus Request Config

| Bus Channel | Assignment |
|---|---|
| 1 | CPU - 14 |
| 2 | I/O B - 20 |
| 3 | I/O C - 24 |
| 4 | I/O D - 28 |
| 5 | Unassigned |
| 6 | Unassigned |
| 7 | Unassigned |
| 8 | Unassigned |
| 9 | Unassigned |
| 10 | Unassigned |

56 Bandwidth Reduction Field

| Bus Channel | Assignment |
|---|---|
| 1 | 50% |
| 2 | 100% |
| 3 | 100% |
| 4 | 100% |
| 5 | Unassigned |
| 6 | Unassigned |
| 7 | Unassigned |
| 8 | Unassigned |
| 9 | Unassigned |
| 10 | Unassigned |

FIG. 3

BUS BANDWIDTH CONTROL SYSTEM

TECHNICAL FIELD

This invention relates to bus bandwidth control.

BACKGROUND

A wide variety of devices produce data that needs to be processed and put onto networks such as the internet or a local intranet. These devices often require a computer system that issues control signals, collects data, and has the capability to put the data onto networks. A System On a Chip (SOC) can be such a computer system. These devices include embedded real-time system products such as color-printers, network enabled projectors, and surveillance cameras with different data bandwidth requirements. This category of devices also includes imaging-specific solutions for offices such as network-enabling printers, digital copiers, multifunction devices (MFDs), faxes, and scanners. Typically, these devices in a single location (such as in an office) share a system bus with a finite bandwidth to communicate with a single computer system. The finite bandwidth of the system bus is shared between the devices with different data bandwidth requirements. These devices plug into the computer system's input/output (I/O) ports and these I/O ports connect with a central processing unit (CPU) of the computer system via the system bus. Typically, these I/O ports and CPU have data buffers that store data to be transferred to somewhere else on the system bus until the system bus is ready to transfer the data.

The I/O ports and the CPU are independent bus masters because each I/O port or CPU can independently transfer data from itself across the system bus to some other I/O or CPU. Such system buses with independent bus masters typically use bus arbitration that arbitrates between different bus masters that are simultaneously waiting to transfer data on the bus. The bus masters signal that they need to transfer data by sending data transfer request signals to the bus arbitration system. Typically, in one data transfer cycle, bus arbitration has some schema to select one bus master from a set of bus masters waiting to transfer data and grants bus access to the selected bus master to transfer a packet of data. In some examples, the size of this data packet relates to the number of parallel data lines in the bus. Thus, if the bus has 32 data lines, for example, the data packet is 32 bits. This cycle is repeated.

SUMMARY

In one aspect, the invention features a system that includes a central processing unit (CPU), one or more input/output (I/O) ports designed to connect with external devices, a data bus connecting the CPU with the I/O ports, bus request and grant channels, and a bus arbiter that executes a repetitive series of the positive number of cycles, where for each cycle, for each of the bus request and grant channels that is assigned to a bus master and that has a weight equal or greater than a number of cycles already executed, if the bus master assigned to the bus request and grant channel has data waiting to be transferred on the bus then the bus arbiter grants the bus master to transfer a data packet from the data using the data bus.

Embodiments of the system may include one or more of the following. A first register configured by the CPU with which bus master can be assigned to each respective bus request and grant channel. A second register configured by the CPU with the weight that can be assigned to each bus request and grant channel assigned to a respective bus master. A third register configured to store which bus master has data waiting to be transferred on the bus. The data bus conveys data between the CPU and the input/output (I/O) ports connected to peripheral devices. The CPU, the bus arbiter, the data bus, and the I/O ports are part of a system on a chip (SOC). There are twice as many bus request and grant channels as bus masters. The number of bus request and grant channels assigned to a bus master can be dependent on bus bandwidth requirements of the bus master.

In another aspect, the invention features a method. The method includes enabling an assignment of each bus master from a plurality of bus masters to one or more bus request and grant channels not already assigned to a bus master, enabling an assignment of a weight from one to a positive number greater than one to each bus request and grant channel that is assigned to a bus master, and for a repetitive series of the positive number of cycles, for each of the bus request and grant channels that are assigned to a corresponding bus master, that has a weight equal or greater than a number of cycles already executed, if the bus master assigned to the bus request and grant channel has data waiting to be transferred on the bus then granting bus access to the bus master to transfer a data packet from the data using a data bus.

Embodiments of the method may include one or more of the following. Storing which bus master can be assigned to each respective bus request and grant channel in a first register. Storing the weight that can be assigned to each bus request and grant channel assigned to a respective bus master in a second register. Storing each of the bus masters assigned to bus request and grant channels that has data waiting to be transferred in a third register. The data bus conveys data between a central processing unit (CPU) and input/output (I/O) ports connected to peripheral devices. The CPU, a bus arbiter, the data bus, and I/O ports are part of a system on a chip (SOC). There are twice as many bus request and grant channels as bus masters. The number of bus request and grant channels assigned to a bus master can be dependent on bus bandwidth requirements of the bus master.

These and other embodiments can have one or more of the following advantages. A bus bandwidth control system allows users to flexibly allocate system bus bandwidth based on the actual needs of each individual functional module within a particular application, under worst-case operating condition. This flexibility allows a computer system with the bus bandwidth control system to fit many applications as long as the total bus bandwidth requirements do not exceed the bus bandwidth capacity of the computer system. These different applications might have different numbers of functional modules sharing the data bus with different individual bus bandwidth requirements. This capability also protects the product from being over-designed to provide full bus bandwidth for all functions at all times under worst-case conditions, thus, minimizes the final computer system cost. When, at times, a peripheral device does not require system bus access, other active modules use the allocated bus bandwidth at that time for increased performance. The bus bandwidth control system guarantees each module the required access to system resources, such as system memory, so that real-time applications never face under-run or over-run situation. Thus, this bus bandwidth control system ensures the quality and reliability of the final system.

Other features, objects, and advantages of the invention will be apparent from the description and drawings, and from the claims.

DESCRIPTION OF DRAWINGS

FIG. 2A is a schematic of a bus request configuration register while FIG. 2B is a schematic of another bus request configuration register.

FIG. 3 is a schematic of a bus request configuration register and a bandwidth reduction field register.

DETAILED DESCRIPTION

Figure 1:
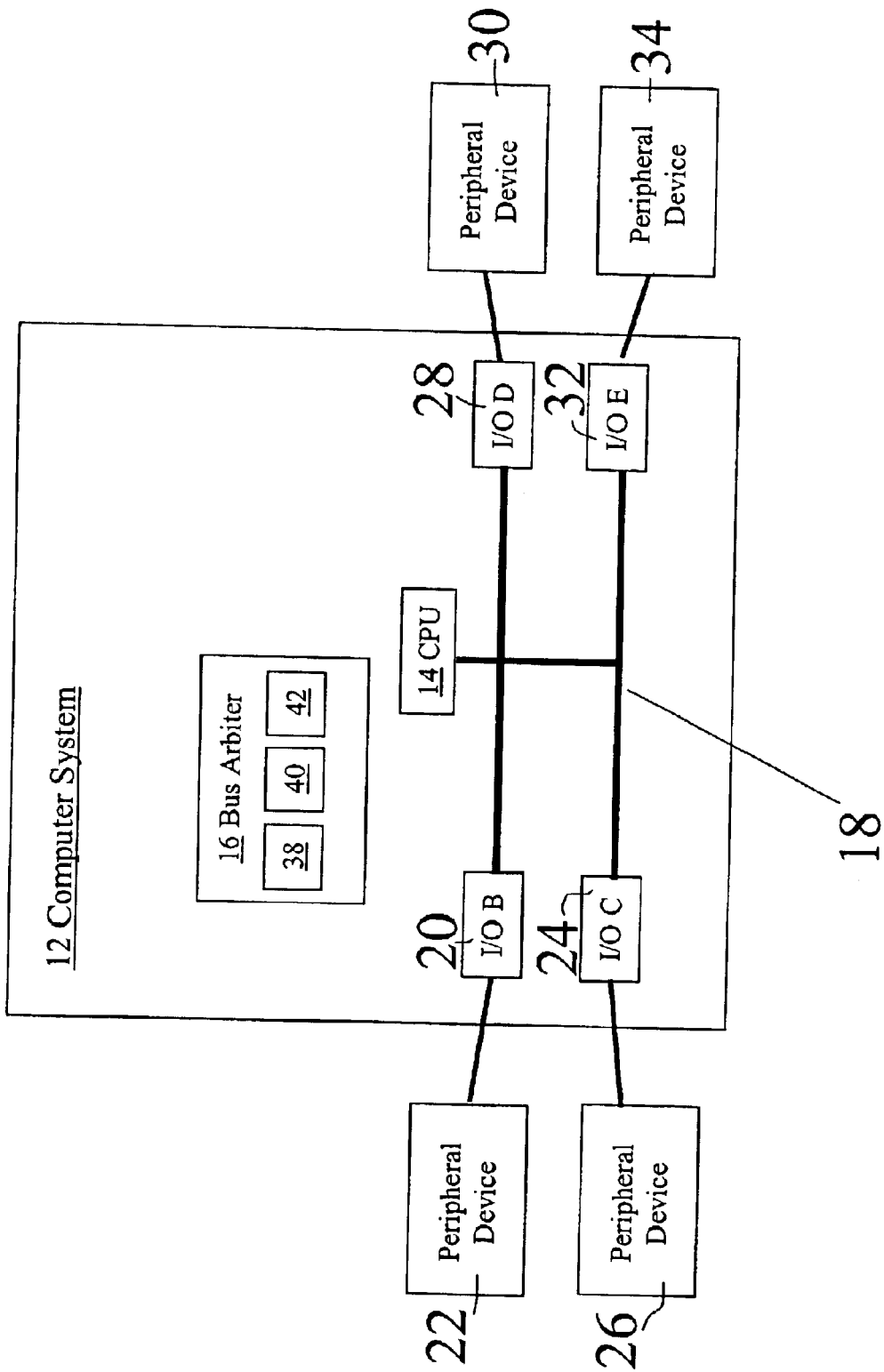
FIG. 1 is a block diagram of a computer system and peripheral devices.

Referring to FIG. 1, system 10 includes computer system 12 and peripheral devices 22, 26, 30, and 34. Computer system 12 includes central processing unit (CPU) 14 and bus arbiter 16. Bus arbiter 16 is configured to have a bus bandwidth control system using software and hardware. Bus arbiter 16 includes bus request configuration (BRC) register 38, bandwidth reduction field (BRF) register 40, and bus request register (BRR) 42. CPU 14 can program bus arbiter 16 to flexibly allocate different amounts of bus bandwidth to devices using data bus 18 for different applications. In some examples, computer system 12 is implemented as a System on a Chip (SoC). SoC technology is the packaging of all the necessary electronic circuits and parts for a "system" (such as a cell phone or digital camera) on a single integrated circuit (IC), generally known as a microchip. For example, a system-on-a-chip for a sound-detecting device might include an audio receiver, an analog-to-digital converter (ADC), a microprocessor, necessary memory, and the input/output logic control for a user, all on a single microchip.

Computer system 12 also includes input/output (I/O) ports 20, 24, 28, and 32. I/O ports 20, 24, 28, and 32 are connected to CPU 14 via system bus 18. Peripheral devices 22, 26, 30, and 34 are connected to computer system 12 via I/O port B 20, I/O port C 24, I/O port D 28, and I/O port E 32, respectively. In this example, CPU 14 and I/O ports 20, 24, 28, and 32 are referred to as independent bus masters. In other examples, there can be other numbers of bus masters. In general, a bus master is the program, either in a microprocessor or more usually in a separate I/O controller, that directs traffic on the computer bus or input/output paths. The bus master is the "master" and the I/O devices on the bus are the "slaves." The bus master actually controls the bus paths on which the address and control signals flow. Once these bus paths are set up, the flow of data bits goes directly between the I/O device and the microprocessor.

Bus arbiter 16 contains n-entry Bus Request Configuration (BRC) register 38, where "n" is twice the number of bus masters on system bus 18. Each entry of BRC register 38 represents a bus request/grant channel. Each request/grant channel can be assigned to only one bus master at a time. However, each bus master can be connected to multiple request/grant channels simultaneously depending on a bus bandwidth requirement of that master. These request/grant channels are entries in BRC register 38 and are used in the bus bandwidth control system. The fraction of request/grant channels assigned to a given bus master divided by the total number of assigned request/grant channels is the fraction of total bus bandwidth assigned to the given bus master.

For one example illustrated in FIG. 2A, the total system bus bandwidth is 100 Mega Bit/second (MB/s) and there are five bus masters (CPU 14, I/O B 20, I/O C 24, I/O D 28, and I/O 32) on the bus but only four of them (CPU 14, I/O B 20, I/O C 24, I/O D 28) are used in a particular application. There are a total of ten bus access/grant channels (labeled #1 through #10) that can be assigned to bus masters. If each bus master is assigned to one bus access/grant channel, the bus bandwidth allocation is 25 MB/second for each bus master. In this example, BRC 50 specifies that channel #1 is assigned to CPU 14, channel #2 is assigned to I/O B 20, channel #3 is assigned to I/O C 24, and channel #4 is assigned to I/O D 28. The remaining channels, #5–#10, are unassigned.

For another application illustrated in FIG. 2B, bus master I/O B 20 requires a bus bandwidth of more than 25 MB/second. Bus master I/O B 20 can be assigned to two bus grant/access channels while the other bus masters (CPU 14, I/O C 24, I/O D 28) are each assigned to just one bus grant/access channel. In this case, BRC 52 specifies that channel #1 is assigned to CPU 14, channel #2 is assigned to I/O B 20, channel #3 is assigned to I/O C 24, channel #4 is assigned to I/O D 28, and channel #5 is assigned to I/O B 20. The remaining channels, #6–#10, are unassigned. This assignment provides 40 MB/s bandwidth to bus master I/O B 20 while bus masters CPU 14, I/O C 24, I/O D 28 each get 20 MB/s bandwidth.

To provide better tuning granularity, each request/grant channel also has a two-bit Bandwidth Reduction Field (BRF) that is stored in BRF register 40 to determine how often bus arbiter 16 can select each request/grant channel to grant bus access to the bus master assigned to the request/grant channel. This frequency is determined by a weight from four to one, where the weight refers to the number of times the bus arbiter 16 chooses to grant bus access to a bus master to transfer a data packet on a given bus access/grant channel out of four opportunities to transfer a data packet. Thus, the weight represents 100%, 75%, 50%, or 25% of the potential bandwidth.

For one example illustrated in FIG. 3, if bus master I/O B 12 requires only 10 MB/s bandwidth while others require 30 MB/s bandwidth, BRC 54 specifies assigning one entry to each of the bus masters CPU 14, I/O B 20, I/O C 24, and I/O D 28. BRF 56 specifies a weight of two or 50% for bus master I/O B 20 and a weight of 4 or 100% for bus masters CPU 14, I/O C 24, and I/O D 28. The flexibility provided by BRF register 40 allows computer system 12 to be configurable for almost any application as long as the total bus bandwidth does not exceed the capacity of the data bus 18. In other implementations, the frequency is determined by a weight from some positive number p, that is other than four and greater than one, to one where the weight refers to the number of times bus arbiter 16 chooses to grant bus access to a bus master assigned to a given bus access/grant channel out of p opportunities to transfer a data packet.

Figure 4:
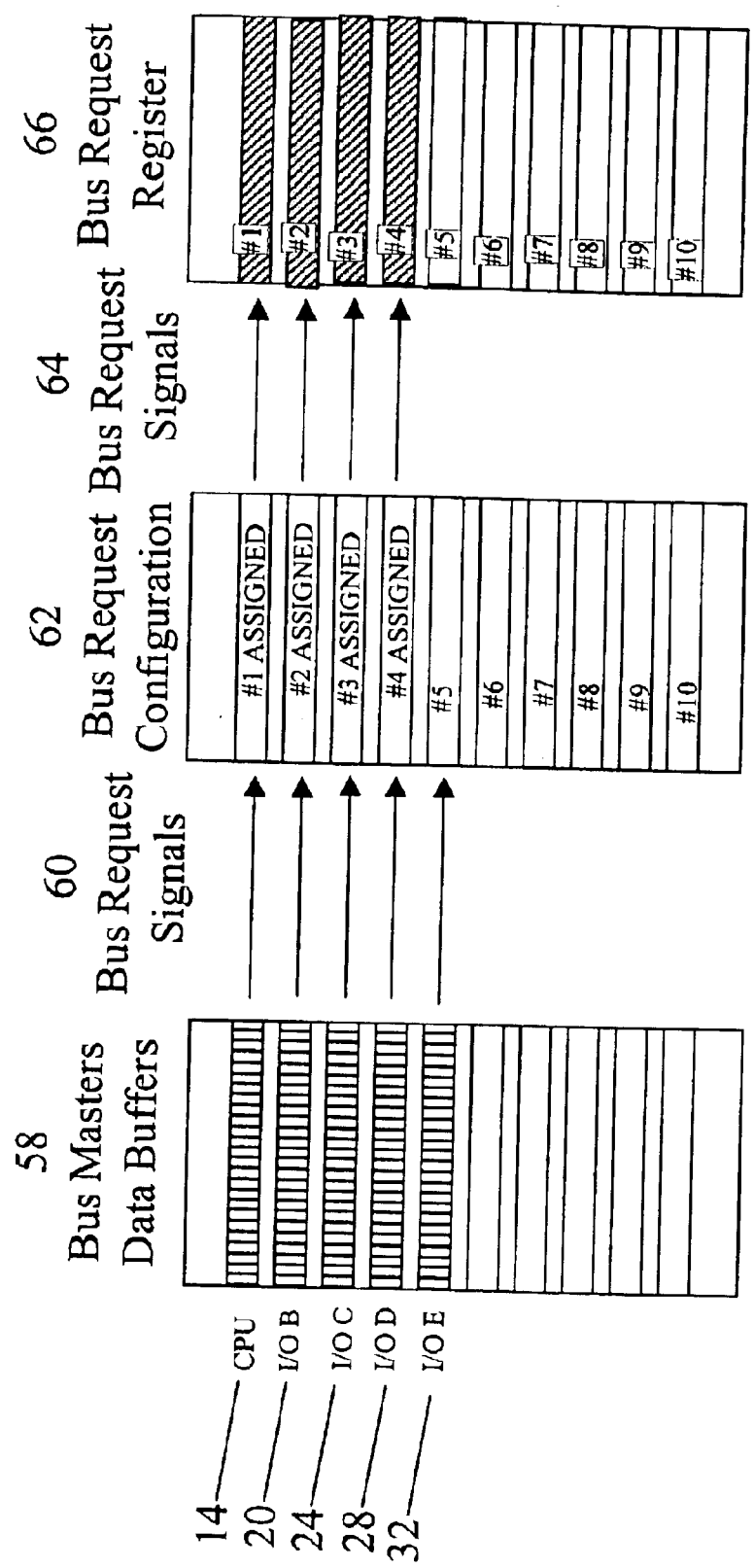
FIG. 4 is a schematic of bus masters, a bus request configuration register and a bus request register.

In FIG. 4, BRC 62 gates the actual bus requesting signals going into ten-entry Bus Request Register (BRR) 66. Every data transfer cycle, the bus arbiter 16 grants bus access to bus masters with data 58 waiting to be transferred based on the BRR 66 entries in a round robin fashion. Unassigned channels in BRC 62 block the corresponding BRR 66 entries, as a default, from being set by any bus request signals. For instance, unassigned channel #5 in BRC 62 blocks entry #5 of BRR 66 from being set by bus request signal I/O E. Upon power up of computer system 12, either CPU 14 is assigned to one of the channels with 100% bandwidth strength as the default setting, or any of a set of predetermined configurations are chosen to be the default power-up set up.

Figure 5:
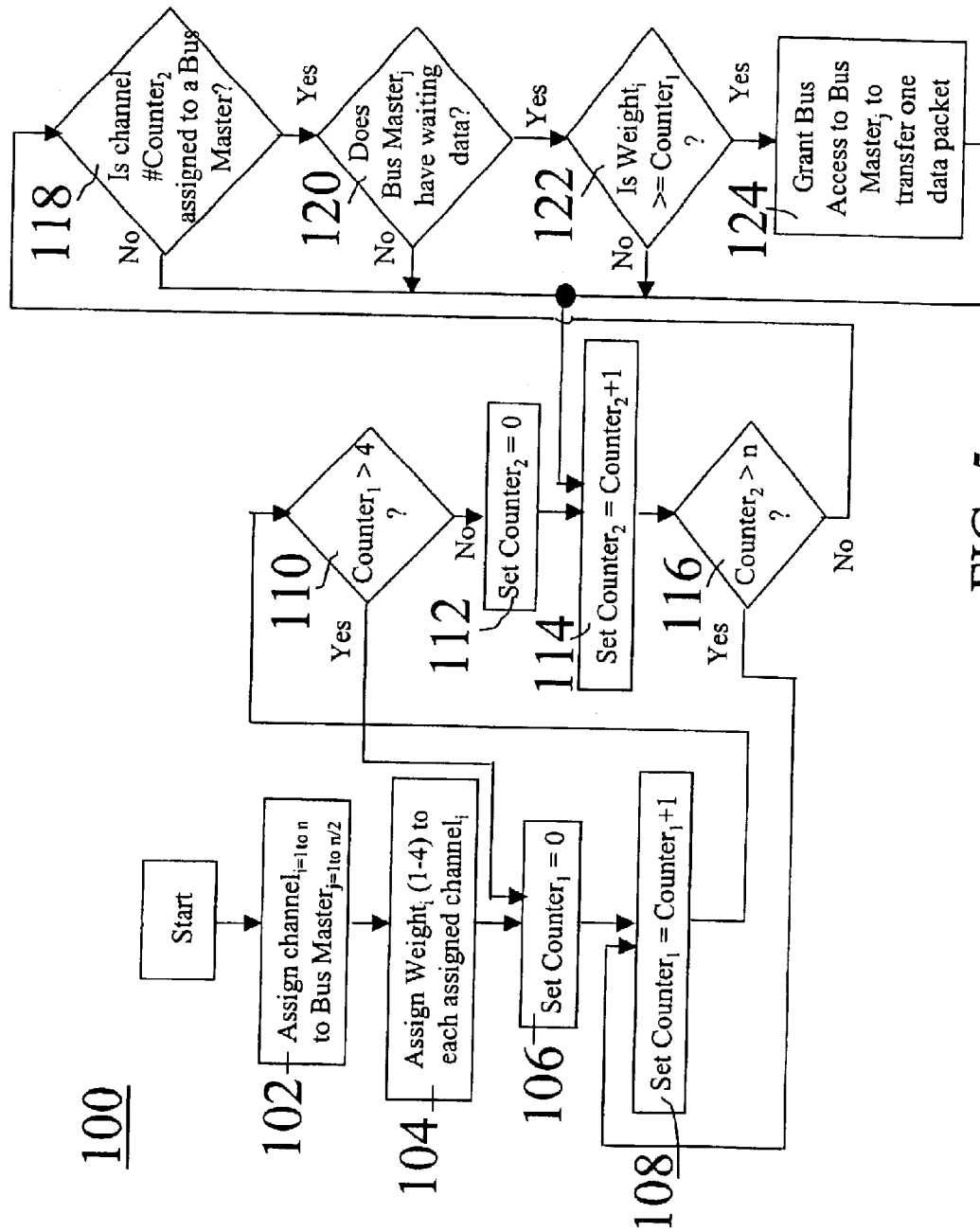
FIG. 5 is a flowchart of a process to control bus bandwidth.

In FIG. 5, bus bandwidth control process 100 includes assigning (102) bus access/grant channels to bus masters and storing the assignment in BRC register 38. The number of bus access/grant channels is twice the number of bus masters. Process 100 assigns (104) a weight from four to one to each assigned bus access/grant channel. Process 100 sets (106) a first channel to zero and increments (108) the first channel by one.

Process 100 checks (110) if the first counter is greater than four. If yes, process 100 goes to (106). If no, process sets (112) a second counter to zero. Process 100 increments (114) the second counter by one and checks (116) if the second counter is greater than the number of channels, n. If yes, then process 100 goes to (108). If no, then process 100 checks (118) if the bus access/grant channel with index of the second counter is assigned to a bus master. If no, then process 100 goes to (114). If yes, then process 100 checks (120) if the bus master has data waiting to be transferred on the bus. If no, process 100 goes to (114). If yes, then process 100 checks (122) if the weight of the bus access/grant channel with index of the second counter is greater than or equal to the first counter. If no, then process 100 goes to (114). If yes, then process 100 grants (124) bus access to the bus master for the transfer of one data packet from the data waiting to be transferred from the bus master to a directed location on the bus and then the process goes to (114).

In other implementations, process 100 is modified by replacing the number "four" by some other positive number p that is greater than one. In these implementations, process 100 assigns (104) a weight from p to one to each assigned bus access/grant channel and process 100 checks (110) if the first counter is greater than p.

The advantages of process 100 include that the total bandwidth of the system bus can be divided between different bus masters based on the requirements of each bus master by assigning different numbers of bus access/grant channels to bus masters. Furthermore, the delay in transferring a data packet from a particular bus master is limited to a few bus data transfer cycles due to the approach of continually checking the bus access/grant channels for waiting data in a round robin fashion.

In some embodiments, process 100 can be implemented in computer readable program code that runs on bus arbiter 16. In other cases, process 100 can be implemented as instructions partially embedded in the circuitry of bus arbiter 16 and partially encoded as computer readable program code that runs on bus arbiter 16.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
   a central processing unit (CPU);
   one or more input/output (I/O) ports designed to connect with external devices;
   a data bus connecting the CPU with the I/O ports;
   bus request and grant channels; and
   a bus arbiter that executes a repetitive series of the positive number of cycles, where for each cycle, for each of the bus request and grant channels that is assigned to a bus master and that has a weight equal or greater than a number of cycles already executed, if the bus master assigned to the bus request and grant channel has data waiting to be transferred on the bus then the bus arbiter grants bus access to the bus master to transfer a data packet from the data using the data bus.

2. The system of claim 1 further comprising a first register configured by the CPU with which bus master is assigned to each respective bus request and grant channel.

3. The system of claim 1 further comprising a second register configured by the CPU with the weight that is assigned to each bus request and grant channel assigned to a respective bus master.

4. The system of claim 1 further comprising a third register configured to store which bus master has data waiting to be transferred on the bus.

5. The system of claim 1 wherein the data bus conveys data between the CPU and the input/output (I/O) ports connected to peripheral devices.

6. The system of claim 5 wherein the CPU, the data bus, the bus arbiter, and the I/O ports are part of a system on a chip (SOC).

7. The system of claim 1 wherein there are twice as many bus request and grant channels as bus masters.

8. The system of claim 1 wherein the number of bus request and grant channels assigned to a bus master is dependent on bus bandwidth requirements of the bus master.

9. A method comprising:
   enabling an assignment of each bus master from a plurality of bus masters to one or more bus request and grant channels not already assigned to a bus master;
   enabling an assignment of a weight from one to a positive number greater than one to each bus request and grant channel that is assigned to a bus master; and
   for a repetitive series of the positive number of cycles, for each of the bus request and grant channels that are assigned to a corresponding bus master, that has a weight equal or greater than a number of cycles already executed, if the bus master assigned to the bus request and grant channel has data waiting to be transferred on the bus then granting bus access to the bus master to transfer a data packet from the data using a data bus.

10. The method of claim 9 further comprising storing which bus master is assigned to each respective bus request and grant channel in a first register.

11. The method of claim 9 further comprising storing the weight that is assigned to each bus request and grant channel assigned to a respective bus master in a second register.

12. The method of claim 9 further comprising storing each of the bus masters assigned to bus request and grant channels that has data waiting to be transferred in a third register.

13. The method of claim 9 wherein the data bus conveys data between a CPU and input/output (I/O) ports connected to peripheral devices.

14. The method of claim 13 wherein the CPU, the data bus, a bus arbiter configured by the CPU, and I/O ports are part of a system on a chip (SOC).

15. The method of claim 9 wherein there are twice as many bus request and grant channels as bus masters.

16. The method of claim 9 wherein the number of bus request and grant channels assigned to a bus master is dependent on bus bandwidth requirements of the bus master.

* * * * *